United States Patent

[11] 3,575,434

| [72] | Inventors | Josef Kiwalle<br>Peoria;<br>Eugene R. Martin, East Peoria, Ill. |
|------|-----------|---|
| [21] | Appl. No. | 803,195 |
| [22] | Filed | Feb. 28, 1969 |
| [45] | Patented | Apr. 20, 1971 |
| [73] | Assignee | Caterpillar Tractor Co.<br>Peoria, Ill. |

[54] ROTARY CHUCK ASSEMBLY
7 Claims, 3 Drawing Figs.

[52] U.S. Cl. .................................................. 279/1H,
279/15
[51] Int. Cl. .................................................. B23b 31/10,
B23b 31/16, B23b 31/30

[50] Field of Search............................................ 279/1 (H),
1 (J), 1 (S), 113

[56] References Cited
UNITED STATES PATENTS

| 2,183,369 | 12/1939 | Schurr........................ | 279/113 |
| 2,570,752 | 10/1951 | Benjamin..................... | 279/1(S)UX |
| 2,883,201 | 4/1959 | Goodrum..................... | 279/113 |
| 3,322,434 | 5/1967 | McClung...................... | 279/123 |

*Primary Examiner*—Andrew R. Juhasz
*Assistant Examiner*—Donald D. Evenson
*Attorney*—Fryer, Tjensvold, Feix, Phillips and Lempio

ABSTRACT: A rotary chuck assembly having chucking members or jaws with rotary gearing being driven by a motor to operate the chucking members into engaging and releasing relation with a workpiece.

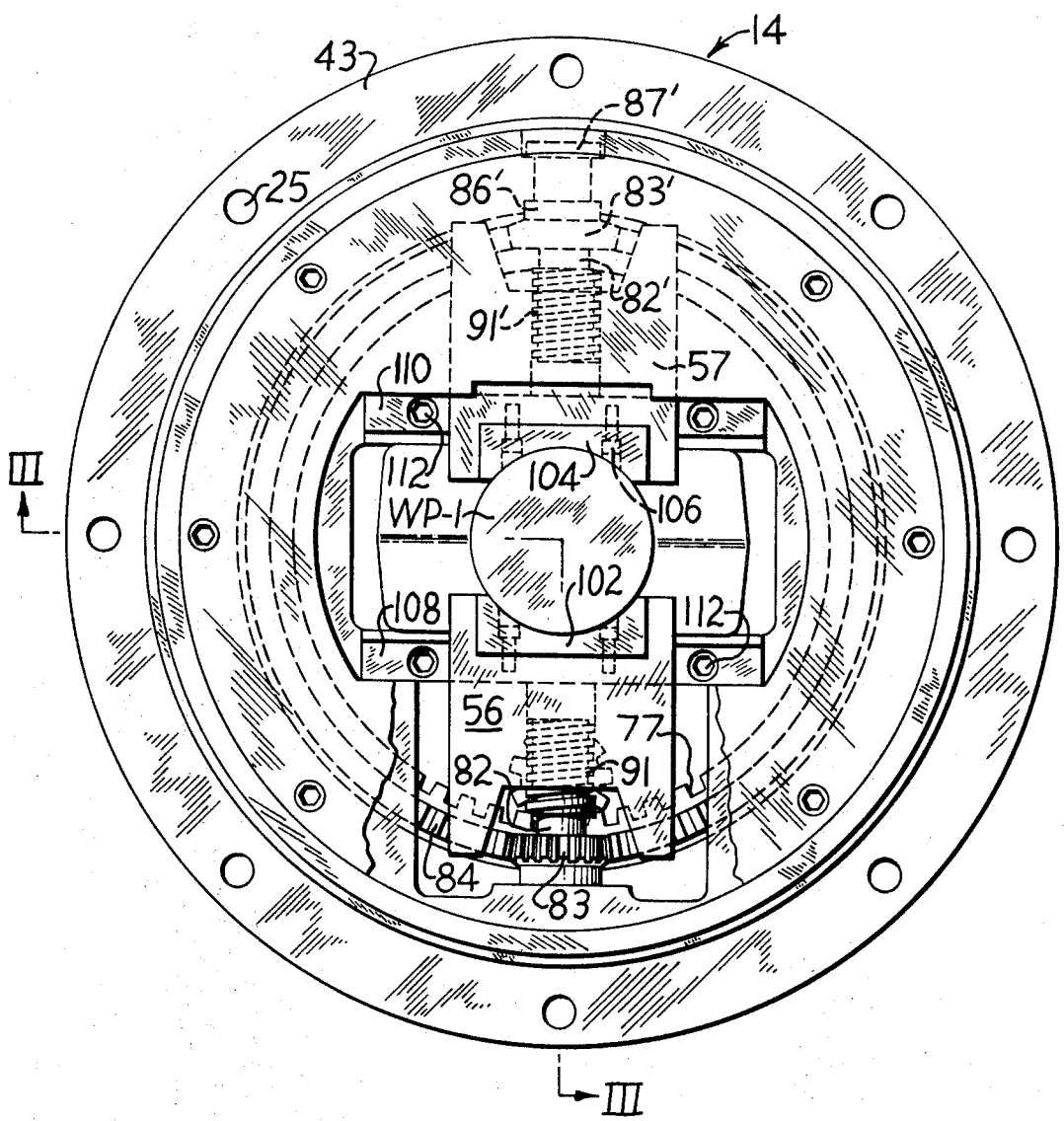

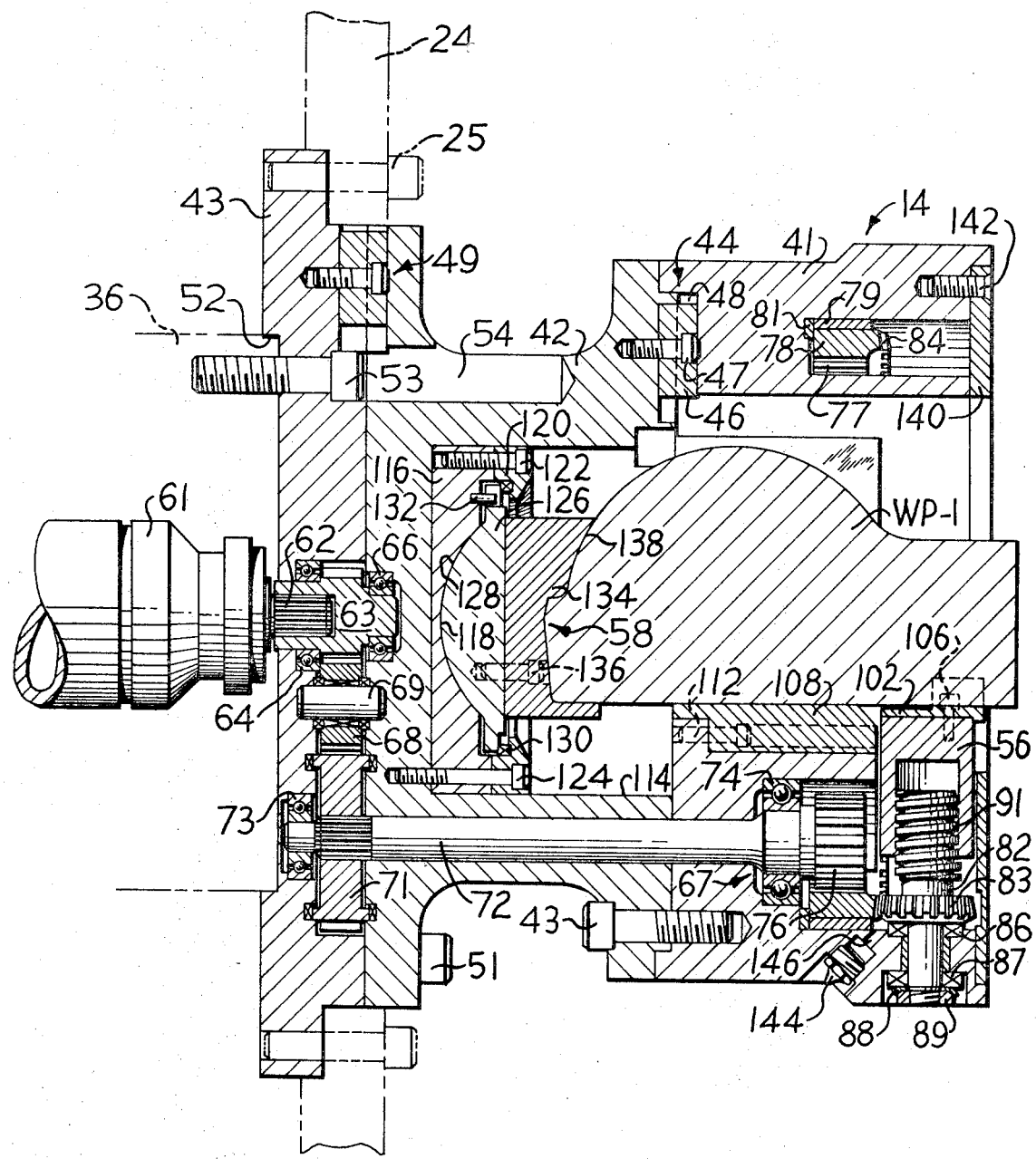

ROTARY CHUCK ASSEMBLY

The present invention relates to a rotary chuck assembly for securing a workpiece. More specifically the invention relates to a rotary chuck which is power actuated for automatic or semiautomatic clamping and unclamping of a weld piece in an inertia or friction welding machine. A selectively operable motor drives rotary gearing which is effectively coupled with the chucking members for causing them to engage or release a workpiece within the assembly.

In the prior art, rotary chuck assemblies of the type contemplated by the present invention commonly employ levers or wedges for operating the chucking members into engaging and releasing relation with a workpiece. These typical prior art chucking assemblies are commonly operated manually for engaging or releasing the workpiece. Increased time and labor are required for such manual operation. In addition, there is a tendency to engage the chucking members upon a workpiece with varying degrees of force.

In many applications such as friction welding, it is also necessary to provide for very accurate alignment of the workpiece, both initially and during operation when large torque forces may be developed within the assembly. The chucking assembly must also be effective in applications such as these to withstand large axial thrust loads which are transferred through the workpiece.

Accordingly, it is an object of the present invention to provide a rotary chucking assembly which is effective to overcome one or more of the problems described above.

It is also an object to provide a chuck assembly which may be adapted for automatic or semiautomatic operation.

It is a further object to provide a chucking assembly which is operable to apply a constant gripping force throughout numerous operating cycles.

It is another object to permit a large amount of travel in the chucking members or jaws in order to accommodate a variety of workpieces and to facilitate insertion and removal of the workpiece in the chuck assembly.

It is still another object to include means within the chucking assembly which permit self-aligning engagement with the workpiece.

Other objects include the enclosed positioning of the chucking members or jaws within the chuck assembly as a safety feature as well as the provision of readily interchangeable parts in the chucking assembly to accommodate various sizes and shapes of workpieces.

Additional objects and advantages of the present invention are made apparent in the following description having reference to the accompanying drawings.

In the drawings:

FIG. 2 is an end view, with parts in section, of the present rotary chuck assembly; and FIG. 3 is a view, with parts in section, taken along section line III—III of FIG. 2.

Figure 1:
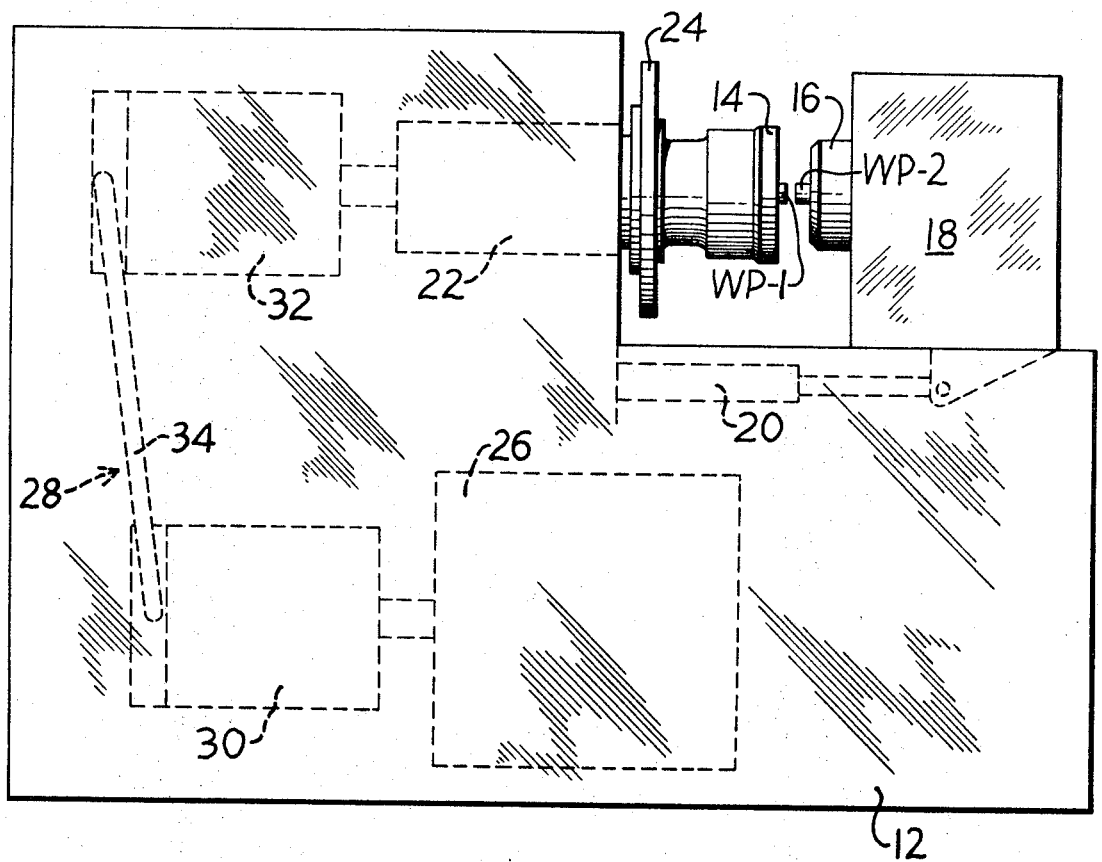
FIG. 1 is a partially schematic side view of an inertia or friction welding machine in which the present chuck assembly may be employed.

A preferred embodiment of the present rotary chuck assembly is described in connection with an inertia or friction welding machine of the type illustrated in FIG. 1. The machine shown in FIG. 1 includes a frame or housing structure generally indicated at 12 for housing the various elements of the machine. Two parts such as workpieces WP-1 and WP-2 are mounted for bonding within chuck assemblies 14 and 16.

The chuck 16 is secured against rotation upon a tailstock fixture 18. The fixture 18 is mounted for axial movement by the machine frame 12 under the control of a load cylinder 20. A pressure control circuit, not shown, regulates the pressure in the load cylinder and thus determines the force with which the parts WP-1 and WP-2 are engaged.

The chuck assembly 14, which is described below in greater detail with respect to FIG. 2 and 3, is mounted upon a rotary spindle (not shown in FIG. 1) with the combined spindle and chuck assembly being supported for rotation within a spindle housing 22.

The chuck assembly 14 is adapted to receive inertia masses or flywheels such as that indicated at 24 which may be of various sizes and masses depending upon the particular application of the machine.

A motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace hydraulic fluid to the motor 32.

The friction welding machine illustrated in FIG. 1 is generally operated in a conventional welding cycle for machines of this type.

A particular embodiment of the present rotary chuck assembly for use in a machine such as that shown in FIG. 1, is illustrated in FIG. 2 and 3. Referring particularly to FIG. 3, the chuck assembly 14 is mounted for rotation upon the spindle which is partially illustrated by broken lines at 36. The chuck is constructed with three external body members including a forward ringlike member 41, and intermediate ringlike member 42 and a rear plate member 43. The members 41 and 42 are secured together by cap screws such as that shown at 43 with relative rotation between the members being prevented by a plurality of key arrangements such as that indicated at 44. Each key arrangement includes a key 46 which is secured to the member 42 by a cap screw 47 while being disposed in a slot 48 formed by the member 41. A plurality of similar key arrangements, such as that indicated at 49, prevents relative rotation between the members 42 and 43 which are also secured together by a plurality of cap screws such as that indicated at 51.

The plate member 43 has a recess indicated at 52 which pilots on to the spindle 36 for proper alignment of the chuck assembly. The plate 43 is secured to the spindle 36 by a plurality of cap screws such as that indicated at 53. A slot 54 is formed in the ringlike member 42 to facilitate removal of each cap screw 53, thus permitting removal of the entire chuck assembly from the spindle.

The chucking assembly includes chucking members or jaws 56 and 57 (that seen in FIG. 2) which are operable for engaging or releasing the workpiece WP-1. The workpiece WP-1 is axially received and supported by a backup assembly indicated at 58. These portions of the chuck assembly are described in greater detail below.

Power to operate the chucking members 56 and 57 is supplied by a rotary hydraulic motor 61 which is disposed within the hollow spindle 36. A splined shaft 62 of the motor mates within a similarly splined gear 63 which is mounted for rotation within plate 43 and member 42 by means of bearings 64 and 66. The gear 63 is effectively coupled with both of the jaws 56 and 57. In FIG. 3, only the coupling arrangement with the jaw 56 is shown. However, a similar coupling arrangement is disposed in an upper portion of the chuck assembly (as seen in FIG. 2) to operate the chucking member or jaw 57 and similar portions of the coupling for jaw 57 are indicated by primed numerals in FIG. 2.

Referring particularly to FIG. 3, the coupling arrangement 67 for operating the jaw 56 includes an idler gear 68 which is supported for rotation upon a shaft 69 and meshes with the gear 63. The idler gear 68 also meshes with another gear 71 which is splined to one end of a shaft 72. The shaft 72 penetrates through the three chuck members 41, 42 and 43 while being supported for rotation by bearings 73 and 74. The forward end of the shaft 72, as indicated at 76, is also formed with gear teeth which mesh with internal teeth 77 of a ring gear 78. At this point, it may be noted that the duplicate drive connection for the jaws 56 and 57 tend to provide rotary balance for the chuck assembly and also to divide the torque force which is applied to the ring gear 78.

The ring gear 78 is supported for rotation and against axial movement by a sleeve bearing 79 and a thrust bearing 81 respectively. Rotational motion of the ring gear 78 is translated into suitable force for operating the chucking member 56 by means of a screw member such as the worm screw indicated at 82. The worm screw 82 is arranged with its axis in radially extending relation from the axis of rotation for the spindle assembly 14. The work screw 82 includes a bevel gear 83 which meshes with external gear teeth 84 on the ring gear 78. The worm screw 82 is also supported for rotation by bearings 86 and 87 while being secured against axial movement by a lock washer 88 and a nut 89. Worm threads 91 formed on the worm screw 82 threadedly engage the jaw 56 so that rotation of the worm screw varies the radial position of the jaw 56 relative to the axis of the chuck assembly 14.

Use of a worm screw in this location provides a self-locking feature for the chuck assembly which tends to prevent slippage of the jaws 56 and 57. Further, the use of chuck jaws, such as those indicated at 56 and 57, together with the worm screw 82, permits wide variation in the opening at the forward end of the chuck assembly in order to accommodate a wide variety of sizes and shapes of workpieces.

The jaws 56, 57 and the backup assembly 58 are provided with replaceable inserts, as discussed in greater detail below. The inserts enable the chucking assembly to firmly engage workpieces of various sizes and shapes. In the present embodiment, those portions of the chucking assembly are shown for use with the workpiece WP-1 being an eye bolt as generally shown in FIGS. 2 and 3. Although the inserts for the jaws and backup assembly are shown for particular adaptation to the eye bolt configuration of the workpiece WP-1, it is apparent that different inserts may be readily employed to receive and secure workpieces of varying sizes and shapes.

As best seen in FIG. 2, replaceable jaw inserts 102 and 104 are fastened to the jaws 56 and 57 respectively by means of cap screws such as that indicated at 106. A portion of each of the jaw inserts is machined to conform to the surface of the workpiece WP-1. Interchangeable inserts 108 and 110 are also secured to the chuck member 41 generally behind the jaws 56 and 57, by means of cap screws 112. The inserts 108 and 110 also conform with the sides of the eye bolt and transfer torque forces between the workpiece WP-1 and the chuck assembly during the welding operation.

The backup assembly 58 is arranged within an internal bore 114 formed by the chuck member 42. The backup assembly receives an end of the workpiece WP-1 to resist axial thrust forces arising in the workpiece during the welding operation. The backup assembly includes a backup plate 116 which is formed with a spherical socket 118. A retainer ring 120 is secured to the backup plate 116 by a plurality of cap screws such as that indicated at 122 and is further secured to the chuck member 42 by a plurality of cap screws such as that indicated at 136. The forward surface 138 of the adapter plate 134 is shaped to conform with the axial end of the workpiece WP-1. Thus, the adapter plate of the backup assembly 58 as well as the adapter plates associated with the jaws 56 and 57 may be readily changed to accommodate workpieces of varying sizes and shapes.

A large portion of the chuck jaws 56 and 57 is covered at the forward end of the chuck assembly by means of a plate 140 which is secured to the chuck member 41 by a plurality of screws such as that indicated at 142. Only the portion of the jaws which hold the jaw inserts 102 and 104 are not covered by the plate 140. Thus the cover plate serves to keep dirt and debris from entering the chuck and the rotating gears which drive the worm screws.

A plurality of lubrication fittings 144 is provided about the periphery of the chuck member 41 to supply lubricating fluid through passages such as that indicated at 146 to lubricate the ring gear and the worm screw mechanisms.

In a typical welding cycle for a friction welding machine employing the present rotary chuck, the jaws 56 and 57 are retracted by operation of the motor 61 so that the workpiece WP-1 may be inserted between the jaws and against the insert plate 134 of the backup assembly 58. The chuck inserts 108 and 110 are then in loose contact with the sides of the workpiece WP-1 and prevent it from moving radially in the chuck during the welding operation. To secure the workpiece within the chuck assembly, the jaws 56 and 57 are then moved radially inwardly by operation of the motor 61 through the drive connection 67 until the jaw inserts 102 and 104 are both in contact with the workpiece WP-1.

Operation of the jaws 56 and 57 is accomplished in the following manner. The hydraulic motor 61 is activated by selective flow of hydraulic fluid under pressure and rotates the shaft 72 which causes the drive connection 67 to rotate the ring gear 78. As the ring gear rotates the worm screws 82 and 82', the jaws 56 and 57 are moved inwardly against the workpieces WP-1. Since both worm screws are operated by a single ring gear, they move forwardly at the same rate and tend to contact the workpiece at the same time. When contact is made between the jaw inserts 102, 104 and the workpiece WP-1, the motor 61 continues to operate in order to tighten the insert upon the workpiece to a preselected torque value. Once this torque value is reached, the motor ceases to rotate. Since the jaws are firmly locked in place by the locking action of the worm screws, the hydraulic fluid can be diverted from the motor 61 and used elsewhere in the system if desirable. It is, in fact, a safety feature to make the continued clamping action of the jaws independent of constant fluid pressure being supplied to the motor, since the jaws remain firmly clamped even if the hydraulic pressure should fail.

When the workpiece is securely engaged within the chuck assembly, the spindle, chuck assembly and workpiece WP-1 are set in rotation and the steps of a conventional inertia or friction welding operation are carried out.

To then remove the workpiece from the chunk, the motor 61 is merely reversed so that the ring gear 78 and the worm gears 82 and 82' are rotated in the opposite direction with the jaws 56 and 57 being retracted from the workpiece. Thus, it is readily apparent that a simple valving arrangement (not shown) for regulating the flow of fluid under pressure to the motor 61 permits the automatic or semiautomatic operation of the chuck assembly of the present invention.

We claim:

1. A rotatable chuck assembly having an axis of rotation and at least two chucking members which are operable to engage and release a workpiece, comprising:
    a screw member arranged in operating relation with at least one of the chucking members,
    rotary gear means coupled in driving relation with the screw member, and
    motor means associated in driving relation with the rotary gear means, the motor means being internally located in symmetrical relationship on the chuck assembly along its axis of rotation for rotation with the chuck assembly.

2. The chuck assembly of claim 1 wherein the motor means is a rotary hydraulic motor.

3. The chuck assembly of claim 1 further comprising a screw member separately associated with each chucking member and coupled with the rotary gear means, the screw member being radially arranged relative to the axis of the chuck assembly.

4. The chuck assembly of claim 3 further comprising a plurality of shafts circumferentially spaced in symmetrical relation about the chuck assembly in driving relation with the ring gear and a shaft axially arranged with respect to the chuck assembly, the axial shaft being coupled with the motor means and with each of the plurality of shafts by gears arranged in balanced relation with respect to the axis of rotation of the chuck assembly.

5. The chuck assembly of claim 4 wherein the motor means is a rotary hydraulic motor.

6. The chuck assembly of claim 4 further comprising a backup assembly arranged within the chuck assembly to receive an end of the workpiece, the backup assembly including a fixed backup plate and a self-aligning seating plate for receiving the workpiece, the seating plate mating at a spherical juncture with the backup plate to permit self-alignment of the seating plate assembly with the workpiece, replaceable adapters being mounted on the chucking members and the seating plate for conforming to the surface of the workpiece.

7. The chuck assembly of claim 4 wherein each screw member is a radially disposed worm gear including a bevel gear meshing with the ring gear, each worm gear being secured against axial motion and threadedly engaging one of the chucking members.

PO-1050
(5/69)

UNITED STATES PATENT OFFICE
CERTIFICATE OF CORRECTION

Patent No. 3,575,434              Dated  April 20, 1971

Inventor(s)     JOSEF KIWALLE, et al

It is certified that error appears in the above-identified patent and that said Letters Patent are hereby corrected as shown below:

Column 3, line 54, after "at" add -- 124. A seating plate 126 has a spherical surface 128 which conforms with the socket 118 to permit universal oscillation of the seating plate 126.

An annular spring seal 130 is partially compressed between the seating plate 126 and the retainer ring 120 to preload the seating plate 126 and to prevent dirt and debris from entering the spherical juncture between the seating plate 126 and the back-up plate 116. The flexibility of the spring 130 permits the seating plate 126 to oscillate under an axial load. The seating plate 126 is also prevented from rotating relative to the back-up plate 116 by means of a pin 132. A replaceable adapter plate or socket block 134 is secured to the face of the seating plate 126 by cap screws such as that indicated at--.

Column 4, line 34, "chunk" should be --chuck--.

Signed and sealed this 23rd day of May 1972.

(SEAL)
Attest:

EDWARD M. FLETCHER, JR.          ROBERT GOTTSCHALK
Attesting Officer                Commissioner of Patents